(12) United States Patent
Rosenauer et al.

(10) Patent No.: US 12,113,583 B2
(45) Date of Patent: Oct. 8, 2024

(54) BEAMFORMING DEVICE TESTING

(71) Applicant: FormFactor, Inc., Livermore, CA (US)

(72) Inventors: Dennis Rosenauer, Tigard, OR (US); Roger Hayward, Beaverton, OR (US); Roy Swart, Hillsboro, OR (US)

(73) Assignee: FormFactor, Inc., Livermore, CA (US)

( * ) Notice: Subject to any disclaimer, the term of this patent is extended or adjusted under 35 U.S.C. 154(b) by 733 days.

(21) Appl. No.: 17/143,850

(22) Filed: Jan. 7, 2021

(65) Prior Publication Data

US 2021/0211210 A1 Jul. 8, 2021

Related U.S. Application Data

(60) Provisional application No. 62/958,546, filed on Jan. 8, 2020.

(51) Int. Cl.
*H04B 17/12* (2015.01)
*H04B 17/16* (2015.01)
*H04B 17/19* (2015.01)
*H04B 7/06* (2006.01)

(52) U.S. Cl.
CPC .......... *H04B 17/12* (2015.01); *H04B 17/16* (2015.01); *H04B 17/19* (2015.01); *H04B 7/0617* (2013.01)

(58) Field of Classification Search
CPC ...... H04B 17/10; H04B 17/101; H04B 17/11; H04B 17/12; H04B 17/15; H04B 17/16; H04B 17/19; H04B 17/29
See application file for complete search history.

(56) References Cited

U.S. PATENT DOCUMENTS

| | | | |
|---|---|---|---|
| 6,377,783 B1 | 4/2002 | Lo | |
| 2006/0270357 A1* | 11/2006 | Puente | G01R 31/31926 455/67.11 |
| 2008/0082886 A1* | 4/2008 | Rasmussen | G01R 31/31924 714/738 |
| 2009/0284425 A1* | 11/2009 | Snow | G01R 29/10 343/703 |

(Continued)

FOREIGN PATENT DOCUMENTS

| | | |
|---|---|---|
| EP | 1496567 | 1/2005 |
| EP | 3584960 | 12/2019 |
| JP | H01-195374 | 8/1989 |

OTHER PUBLICATIONS

Janssen et al. "Conducted Beamforming Testing in the Millimeter Wave Spectrum," WSA 2019; 23rd International ITG Workshop on Smart Antennas, Vienna, Austria, 2019.

*Primary Examiner* — Huy Q Phan
*Assistant Examiner* — David B Frederiksen
(74) *Attorney, Agent, or Firm* — LUMEN PATENT FIRM

(57) ABSTRACT

Improved electrical testing of N-port beamforming devices is provided. For testing, an N:1 electrical network is connected to the N ports of the device under test to provide a single test port. This mode of testing can be used to determine parameters of interest (e.g., far field radiation patterns etc.) of the device under test more rapidly than with antenna range testing or with characterization of each port of the device under test. The N:1 electrical network can be passive or active. The N:1 electrical network can be integrated in a probe head to provide probe array testing of beamforming devices. Alternatively, the N:1 electrical network can be integrated with the device under test to provide onboard testing capability.

12 Claims, 12 Drawing Sheets

(56) References Cited

U.S. PATENT DOCUMENTS

| | | | |
|---|---|---|---|
| 2015/0092824 A1* | 4/2015 | Wicker, Jr. | H04L 25/0204 |
| | | | 375/224 |
| 2016/0050569 A1* | 2/2016 | Olgaard | H04W 24/02 |
| | | | 370/252 |
| 2016/0212641 A1* | 7/2016 | Kong | H04B 17/0087 |
| 2017/0070405 A1* | 3/2017 | Hashemi | H04B 1/0057 |
| 2018/0006745 A1* | 1/2018 | Vanwiggeren | H04B 17/3912 |
| 2018/0302178 A1* | 10/2018 | Lloyd | H04B 17/102 |
| 2019/0148829 A1 | 5/2019 | Ananth | |
| 2020/0081049 A1* | 3/2020 | Lin | H04B 17/391 |

\* cited by examiner

BEAMFORMING DEVICE TESTING

CROSS REFERENCE TO RELATED APPLICATIONS

This application claims the benefit of U.S. provisional patent application 62/958,546, filed on Jan. 8, 2020, and hereby incorporated by reference in its entirety.

FIELD OF THE INVENTION

This invention relates to testing of multi-input or multi-output beamforming devices.

BACKGROUND

Testing integrated circuits with phased array antenna beamformers is difficult because there are a large number of high frequency ports that need to be tested for magnitude and relative phase. The most direct solution (e.g., as on FIG. 1A) is to use a multi-port vector network analyzer and measure the magnitude and phase of the transmission parameter (S21) from the RF input to each of the beamforming outputs. In many cases this can be very difficult since there are frequency conversion circuits in the integrated circuit and the conversion oscillator needs to be accounted for in the measurement method. Furthermore, the number of outputs can be very large, which will tend to make per-output testing very costly and time-consuming.

An alternative conventional testing approach (e.g., as on FIG. 1B) is to place the beamformer in an antenna test range and directly characterize its performance in terms of relevant parameters, such as beam width, side lobe suppression and steering performance. More specifically, conventional testing of a beamformer with an antenna test range is done by connecting the beamformer to a set of radiating elements. Such elements can be individual dipoles or the patches in a patch antenna array. Then the beamformer plus the radiating elements are placed in an antenna test range to check the radiation pattern, side-lobes etc. After all, one typically only cares about an element-level specification (e.g., S21 amplitude and phase of element 3) to the extent that it affects the relevant parameters. However, this approach also has its disadvantages, most significantly the use of an antenna test range.

SUMMARY

In this work, we provide a new testing concept for beamforming devices. The main idea is to provide an active or passive beam combiner directly connected to the multiple outputs (or inputs) of the device under test as part of the test instrumentation. This provides a single input/output for testing, thereby greatly reducing both the time needed to test and the complexity of the required test equipment. This single input/output can also effectively provide measurements of relevant device parameters, without the expense of having to use an antenna test range.

Some simple examples will help clarify the concept. We assume the device under test is an N output beamformer intended to steer a narrow beam over a specified angle range. Suppose the beam combiner is a passive and balanced N to 1 combiner. Then the beam combiner is effectively positioned 'on-axis' in the far field relative to the device under test. By steering the beam by controlling the device under test, the beam combiner will effectively see how this steering looks from a far-field on-axis view point. The analogy with a detector placed on-axis in the far field in an antenna test range is very close.

If the beam combiner is an active device, more sophisticated operations are possible. E.g., phase shifting of the beam combiner inputs can cause it to be virtually positioned at a controllable off-axis location, relative to the device under test. Here the analogy is with a detector placed off-axis in the far field in an antenna test range.

An important advantage of this approach is that the beam combiner as described above can be integrated with a probe array for testing electrical circuitry. This enables the testing of beamforming circuits with an efficient probe-based approach, as opposed to having to do detailed channel by channel RF characterization, or having to take the device under test to a physical antenna test range. Such probe arrays can be vertical probe arrays or membrane probe arrays. An external beamforming network can be added to engineering probes by connecting the beamforming network to the probes with cables. The cable lengths and hence phase can be adjusted to steer the beam. Another possibility is integration of the beam combiner as described above with the device under test. That can be used to provide on-board diagnostics for beamforming devices.

Significant advantages are provided.

1) Reduction of the number of RF test ports required at the tester simplifies testing.

2) With a passive N:1 beamforming network, phase calibration is not required.

3) An active beamforming network can be used to make a very versatile test system.

4) This approach is faster than an antenna range measurement. It is also faster than port by port measurements with a VNA (vector network analyzer) or VSA (vector signal analyzer).

5) This approach allows for integrated on-chip testing

DETAILED DESCRIPTION

Figure 1A:
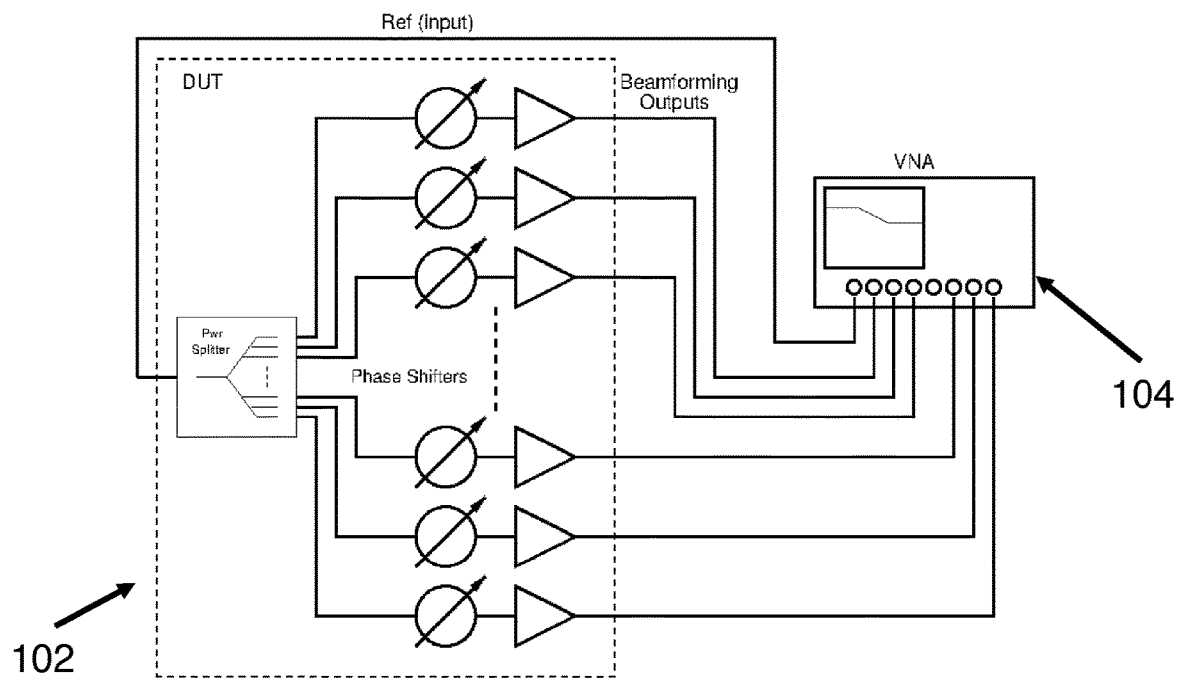
FIGS. 1A-B show two conventional testing approaches for multi-port devices.
Figure 1B:
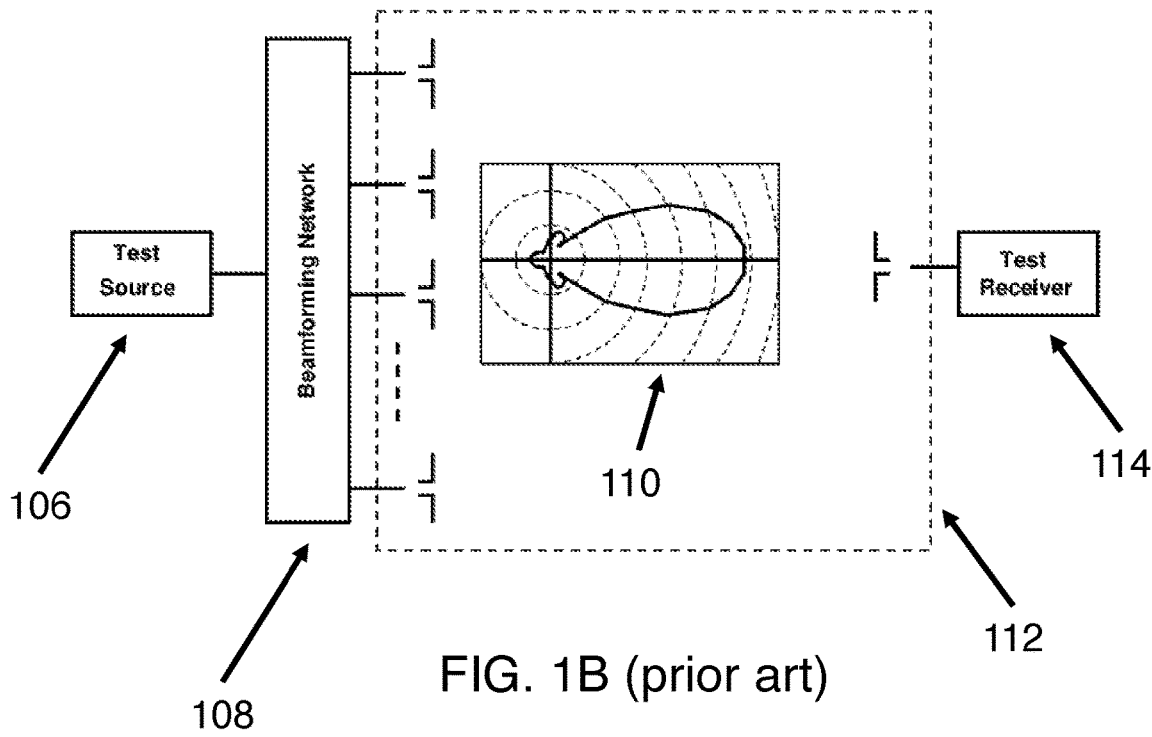

FIGS. 1A-B show two conventional testing approaches for multi-port devices. In the example of FIG. 1A a beamforming device under test 102 is connected to a vector network analyzer 104. This provides the capability of testing each port of the device under test individually, but as indicated above, this is time consuming and may be more information than is needed to confirm proper operation. In the example of FIG. 1B, a beamforming device under test 108 is driven by a test source 106 in an antenna range 112. The result is a beam pattern 110 which can be characterized by moving receiver 114 around within the far field of device under test 108 and/or by steering the beam with beamforming device under test 108. Alternatively and/or in addition, multiple receivers can be used to expedite characterization of the far field radiation pattern. However, antenna range testing is costly and time consuming.

Figure 2:
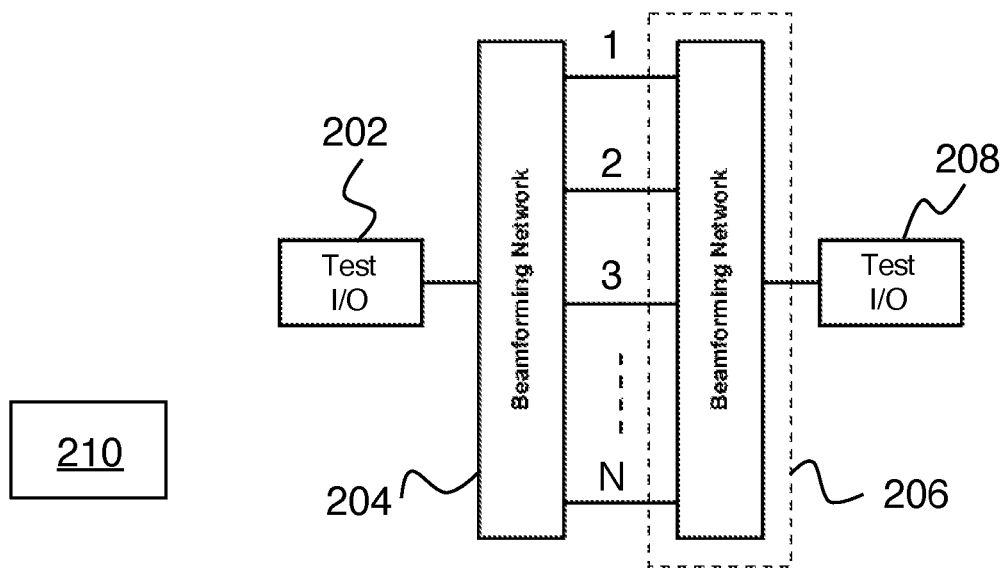
FIG. 2 schematically shows the testing concept of embodiments of the invention.

FIG. 2 schematically shows the testing concept of embodiments of the invention. Here a device under test 204 is connected to another beamforming network 206, which in turn is connected to a single test input/output 208. Here 202 is the test I/O to device under test 204, and 210 is a test controller configured to control at least the electrical device under test to provide characterization of the electrical device under test. Test controller 210 can also be configured to control beamforming network 206 and/or the test inputs provided to the device under test. Connections between test controller 210 and the other components are not shown to reduce clutter on the figure, especially since some of these connections are optional.

As indicated above, this test configuration can effectively simulate antenna range testing, with significantly reduced testing time and cost. By combining the individual beamforming signals in an electrical network, we can synthesize the equivalent of the composite source antennas and receive antenna in space. This allows us to make electrical measurements that are equivalent to the antenna pattern in space but without radiating an actual signal. This effectively provides testing of the beamforming network without actually connecting it to an antenna array and testing it in an antenna test range. In essence we have created a "Virtual Antenna Range". Since the antenna and range measurements are reciprocal, we can interchange the receiver and source and obtain the same results.

More specifically an exemplary embodiment of the invention is apparatus for electrically testing an N-port electrical device under test, where the apparatus includes:

an N:1 electrical signal network (e.g., 206 on FIG. 2) configured to be directly connected to the N ports of the electrical device under test (e.g., 204 on FIG. 2) and to provide a single electrical test port (e.g., 208 on FIG. 2); and a test controller (e.g., 210 on FIG. 2) configured to control at least the electrical device under test to provide characterization of the electrical device under test.

Here the characterization uses the single electrical test port as a test input and/or output instead of individually using the N ports of the N-port electrical device under test as test inputs and/or outputs.

The N-port electrical device under test can be a beamforming transmitter, and the N:1 electrical signal network can be configured as a virtual antenna range such that the single electrical test port provides an output signal from the N-port electrical device under test at a selected far field direction. The N:1 electrical signal network can be an active network configured to be controlled by the test controller, so that the selected far field direction can be varied by the test controller. This is analogous to moving receiver 114 of FIG. 1B around in the far field of device under test 108 to measure the far field transmission pattern of device under test 108.

The N-port electrical device under test can be a beamforming receiver, and the N:1 electrical signal network can be configured as a virtual antenna range such that the single electrical test port provides a test signal to the N-port electrical device under test at a selected far field direction. The N:1 electrical signal network can be an active network configured to be controlled by the test controller, so that the selected far field direction can be varied by the test controller. This is analogous to changing receiver 114 of FIG. 1B to a transmitter and moving it around in the far field of device under test 108 to measure the far field reception pattern of device under test 108.

Thus practice of the invention does not depend on whether the device under test is operating as a transmitter or as a receiver while it is under test. Accordingly, 1:N and N:1 electrical signal networks will be taken to be synonyms throughout this description. What is important here is that an N port device under test is characterized via a single test port connected to the N ports of the device under test by the N:1 electrical signal network.

Figure 3:
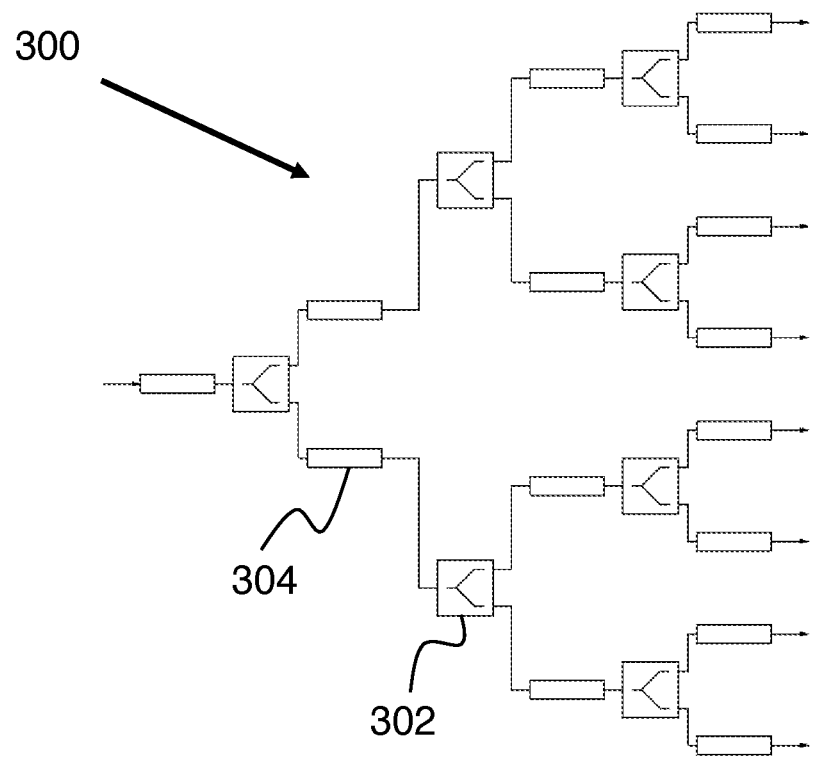
FIG. 3 shows an exemplary passive signal splitter.

The N:1 electrical signal network can be a passive network, as in the example of FIG. 3. Here passive splitter 300 is formed from 1:2 splitters 302 and transmission line segments 304 as shown. The phase shift can be adjusted by changing the length of transmission lines between splitters or the outputs. Although the example of FIG. 3 shows a 1:8 splitter, generalizations of this to provide 1:N splitting (or combining) are well known in the art.

Figure 4A:
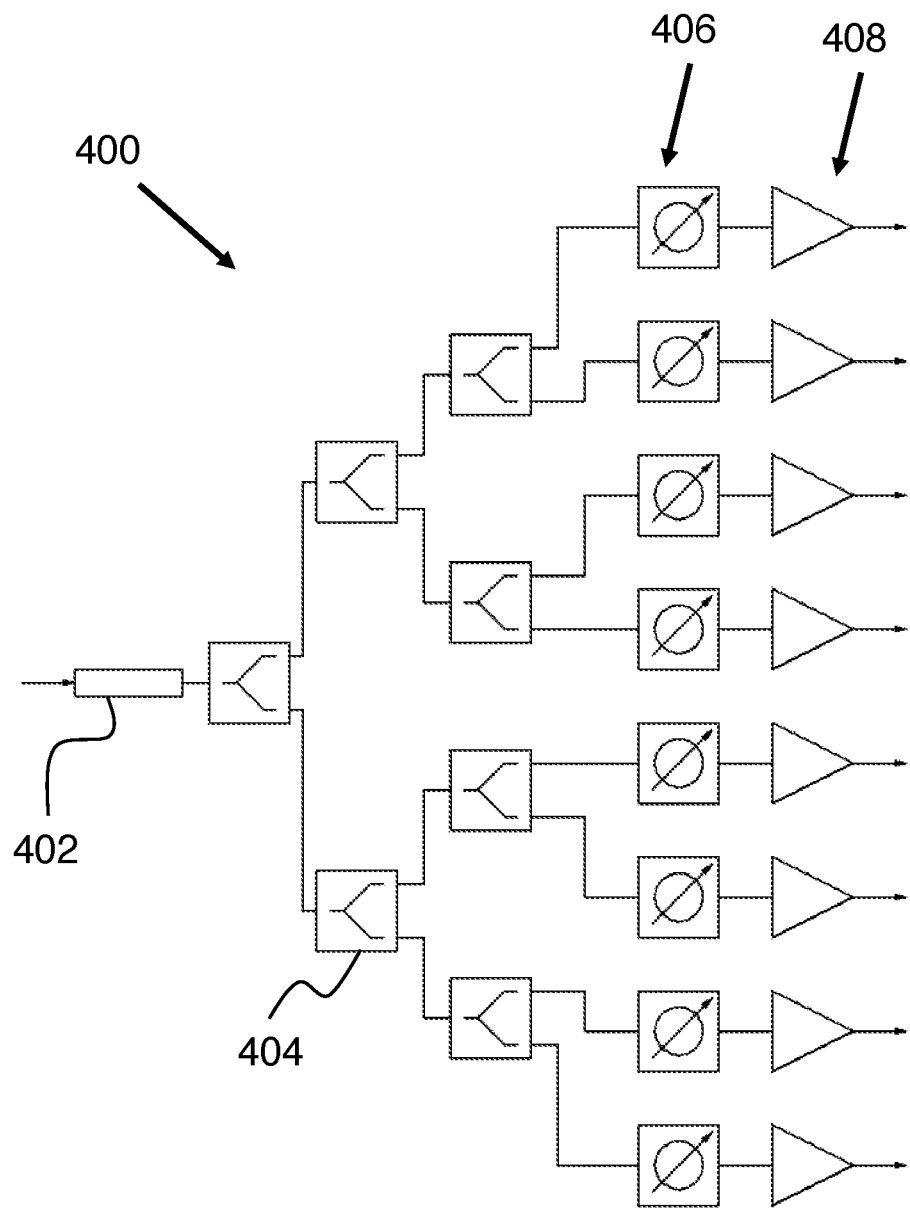
FIG. 4A shows an exemplary active signal splitter.
Figure 4B:
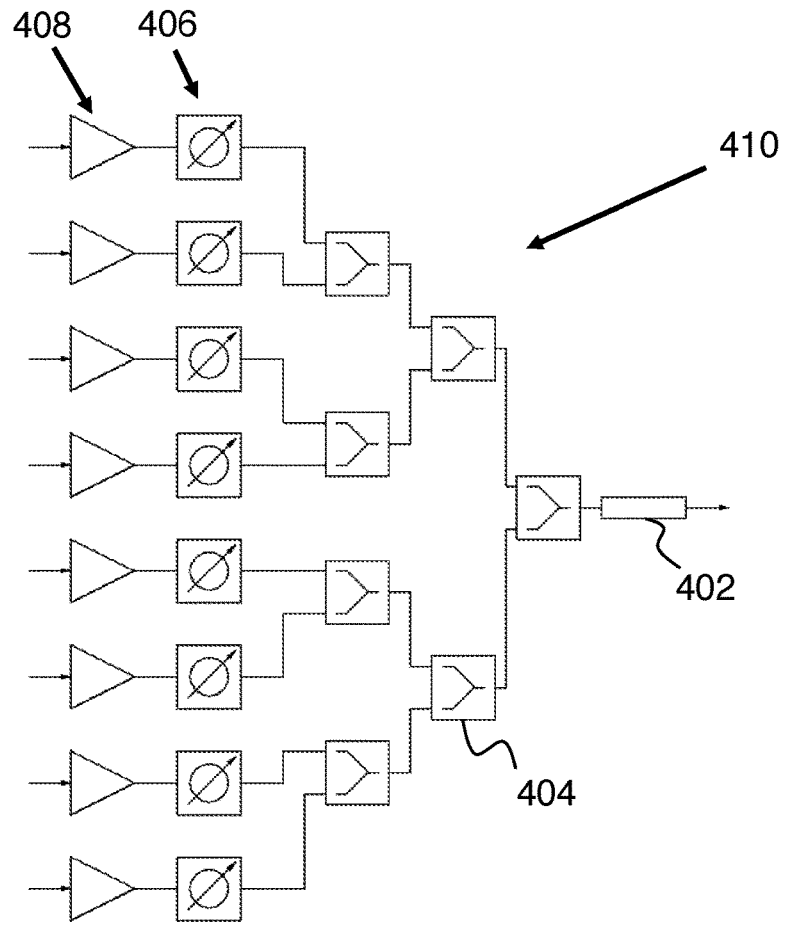
FIG. 4B shows an exemplary active signal combiner.

The N:1 electrical signal network can be an active network configured to be controlled by the test controller. FIG. 4A shows an exemplary active signal splitter 400 (e.g., for use in testing a device under test in receive mode). FIG. 4B shows an exemplary active signal combiner 410 (e.g., for use in testing a device under test in transmit mode). In these examples, transmission line segments are referenced as 402, 1:2 (or 2:1) splitters/combiners are referenced as 404, variable phase shifters are referenced as 406 and variable gains are referenced as 408. Devices for providing such variable phases and gains are well known in the art. Changing the phase shift allows for the beam to be dynamically steered and changing the gain can vary the sidelobe levels. This is a common structure for beamforming integrated circuits.

Figure 5A:
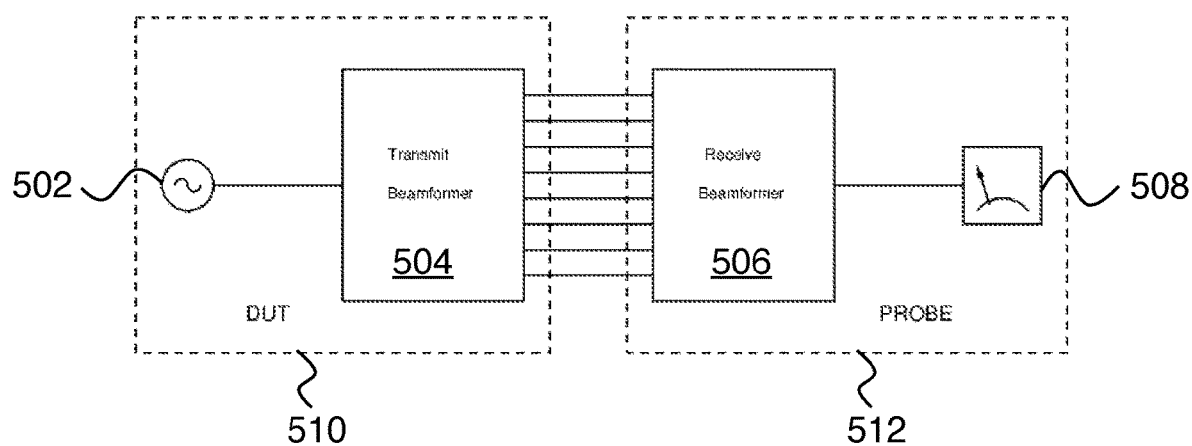
FIG. 5A shows the simulated test configuration for the results of FIGS. 5B-E.

Simulations have been performed to confirm that this testing concept works as described. FIG. 5A shows the simulated test configuration for the results of FIGS. 5B-E. The simulation includes source 502 provided to transmit beamformer 504. Transmit beamformer 504 is the simulated device under test (DUT 510). The simulation (Probe 512) also included a receive beamformer 506 (i.e., a simulation of an N:1 electrical signal network as described above) and a single test port 508. Receive beamformer 506 acts as a receive antenna with the pattern as created by its phase shift network, to operate as a directional receive antenna effectively pointed at transmit beamformer 504.

Figure 5B:
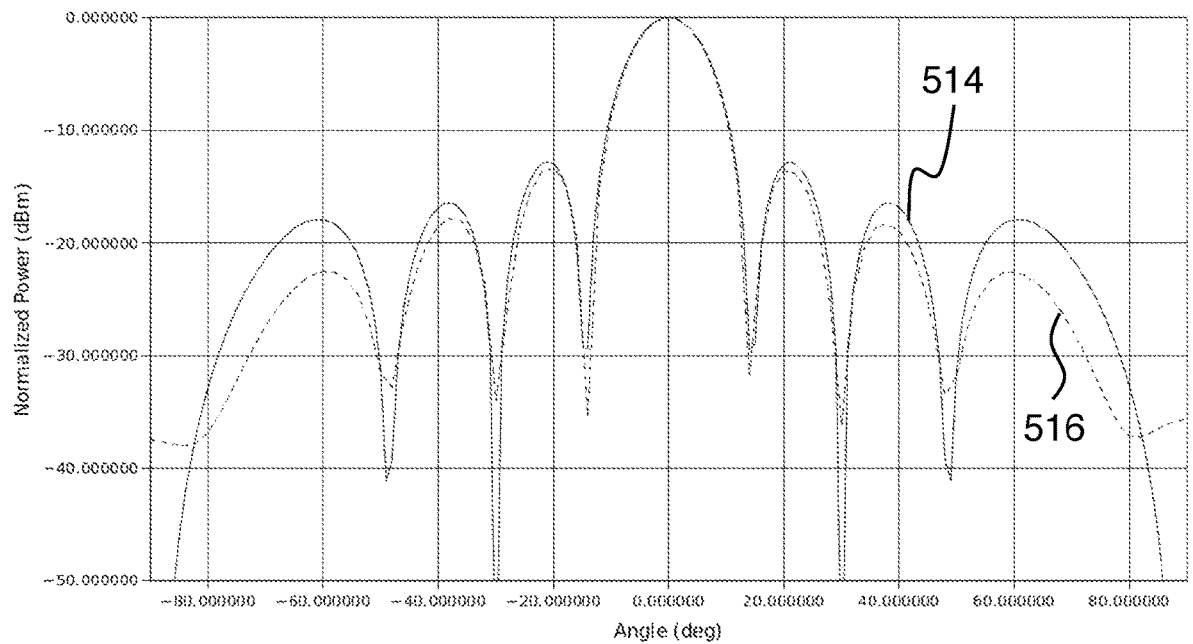
FIGS. 5B-C compare physically simulated beam patterns to beam patterns as determined by simulated testing according to an embodiment of the invention.
Figure 5C:
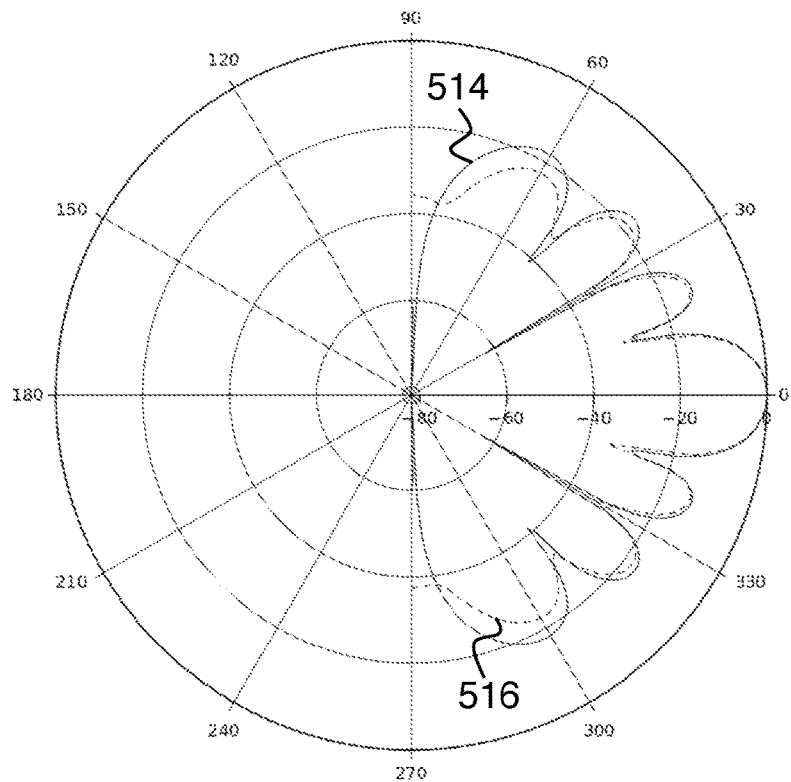

FIGS. 5B-C compare physically simulated beam patterns to beam patterns as determined by simulated testing according to an embodiment of the invention. Here FIG. 5C is a polar plot of the data of FIG. 5B, the physical simulation results are shown with solid line 514, and the results from simulation of an embodiment of the invention are shown with dashed line 516.

More specifically, the physical simulation results are performed with an electromagnetic field simulator based on the parameters of simulated device under test 504. Solid line 514 is the resulting simulated far field radiation pattern of simulated device under test 504. The results of dashed line 516 are obtained by simulating the configuration of FIG. 5A using appropriate phase shifts in receive beamformer 506 to virtually generate far field angles as described above. As can be seen from FIGS. 5B-C, the agreement between the two simulation results is good, which proves the concept of this "virtual antenna range".

Figure 5D:
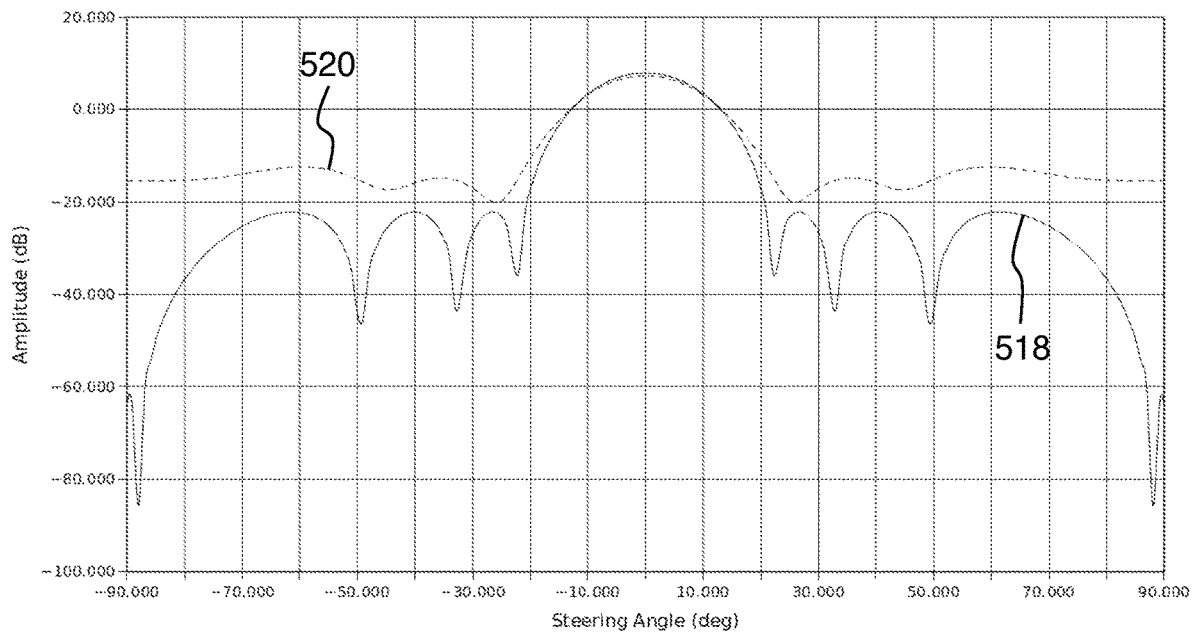
FIGS. 5D-E compare beam patterns from normal and faulty beamformers as determined by simulated testing according to an embodiment of the invention.
Figure 5E:
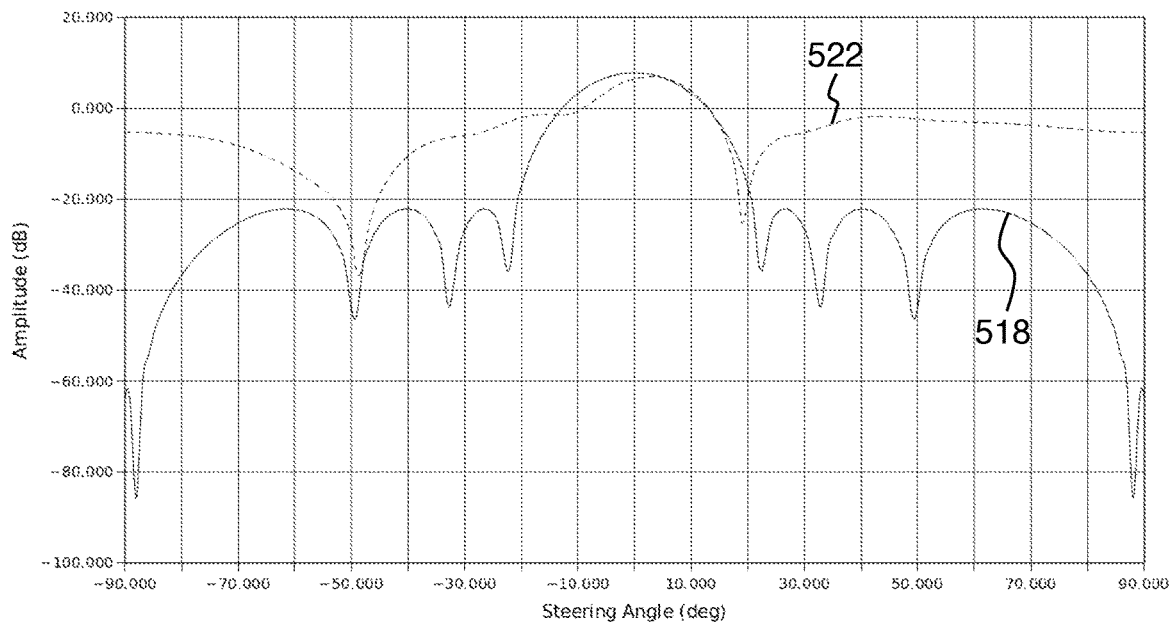

Further verification of this concept is seen on FIGS. 5D-E, which compare beam patterns from normal and faulty beamformers as determined by simulated testing according to an embodiment of the invention. Here 518 on both plots is the simulated performance of a normally operating transmit beamformer 504 on FIG. 5A. Curve 520 on FIG. 5D shows the result of a first simulated fault condition (amplitude fault on one of the beams) in transmit beamformer 504. Curve 522 on FIG. 5E shows the result of a second simulated fault condition (phase fault on one of the beams) in transmit beamformer 504. In both cases, the presence of a fault leads to substantial differences in the simulated results relative to normal operation. This shows that testing as described herein can be sensitive enough to detect realistic faults in a beamforming device.

The N:1 electrical signal combiner can be integrated with a probe array for testing electrical devices, so that the N-port electrical device under test can be tested via probing. FIGS. 6A-D shows several examples of this. In vertical probe heads, the beam-forming network can be fabricated as a passive metal structure in the layers of printed circuit boards (PCBs) or space transformers or guide plates, or incorporated as an active die in various locations in the probe head. In cantilever probe heads, the beam-forming network can be fabricated as a passive metal structure in the polyimide layers of the probe head, or incorporated as an active die in various locations in the probe head.

Figure 6A:
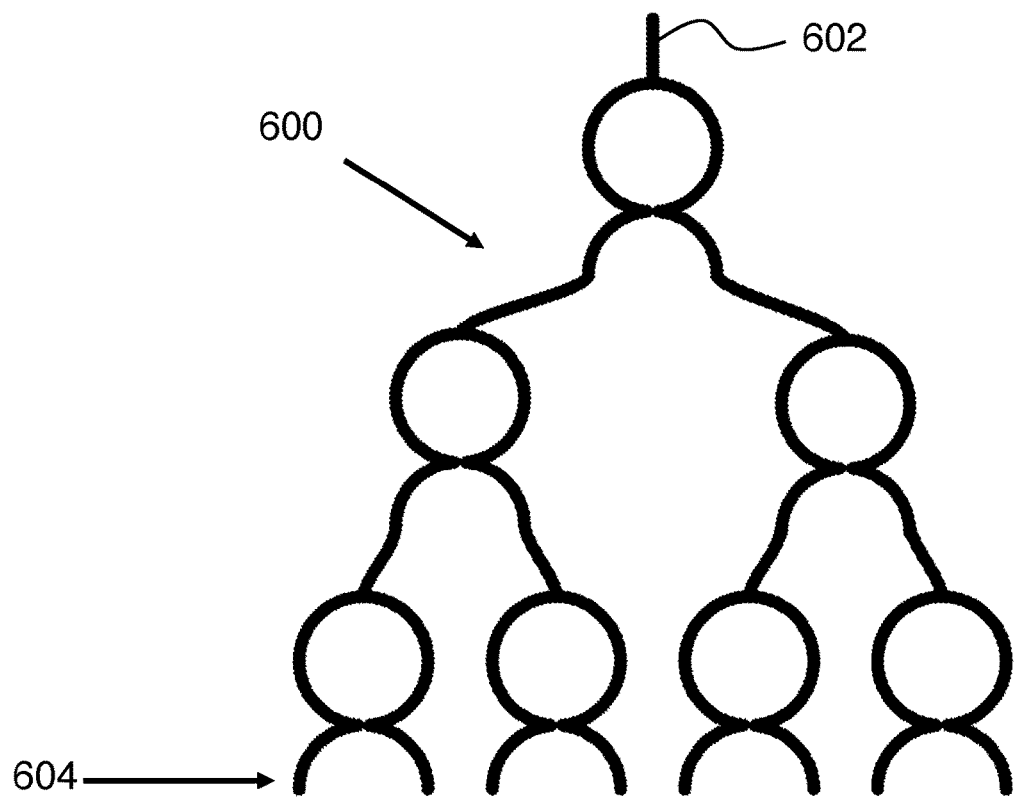
FIG. 6A shows an exemplary passive signal splitter (or combiner) suitable for integration with a probe head.

FIG. 6A shows an exemplary passive signal splitter (or combiner) 600 suitable for integration with a probe head. Here 602 is the single test input/output and 604 are the N ports for connection to the device under test. This example is a Wilkinson divider tree.

Figure 6B:
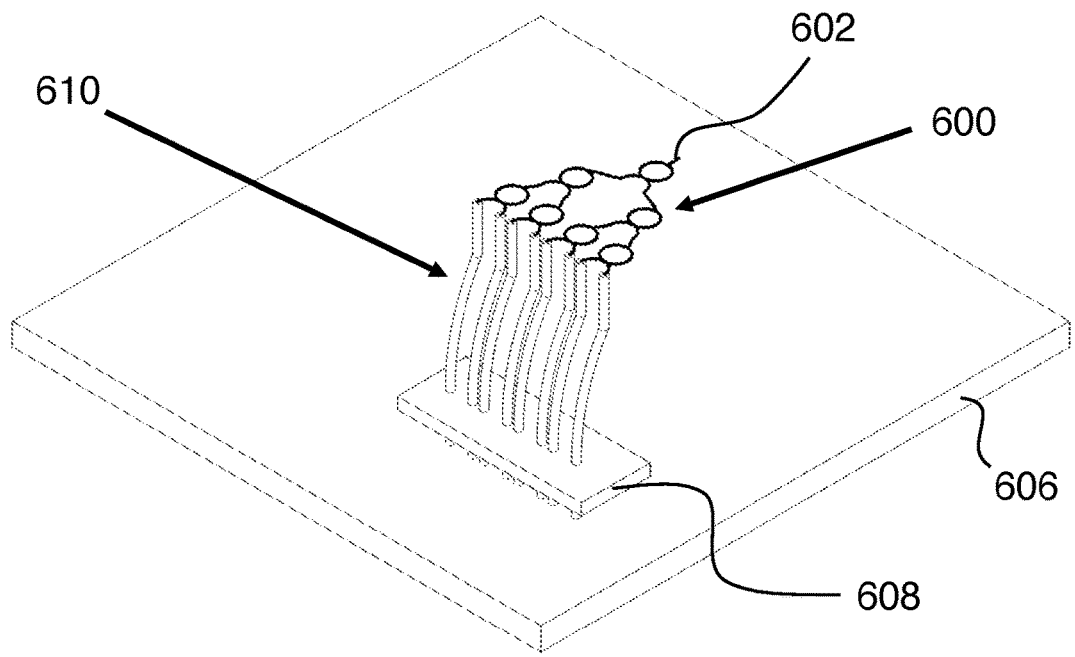
FIG. 6B schematically shows an example of integration of the device of FIG. 6A with an array of vertical probes.

FIG. 6B schematically shows an example of integration of the device of FIG. 6A with an array of vertical probes 610. Here 606 is the device under test, 608 is the bottom guide plate of the probe array, and the top guide plate of the probe array is not shown because it would be confusing in this view to do that. Furthermore, practice of the invention does not depend on details of the mechanical configuration of the probe head. Although the example of FIG. 6B shows a vertical probe array, integration of the N:1 electrical signal combiner with an array of cantilever probes is also possible.

Figure 6C:
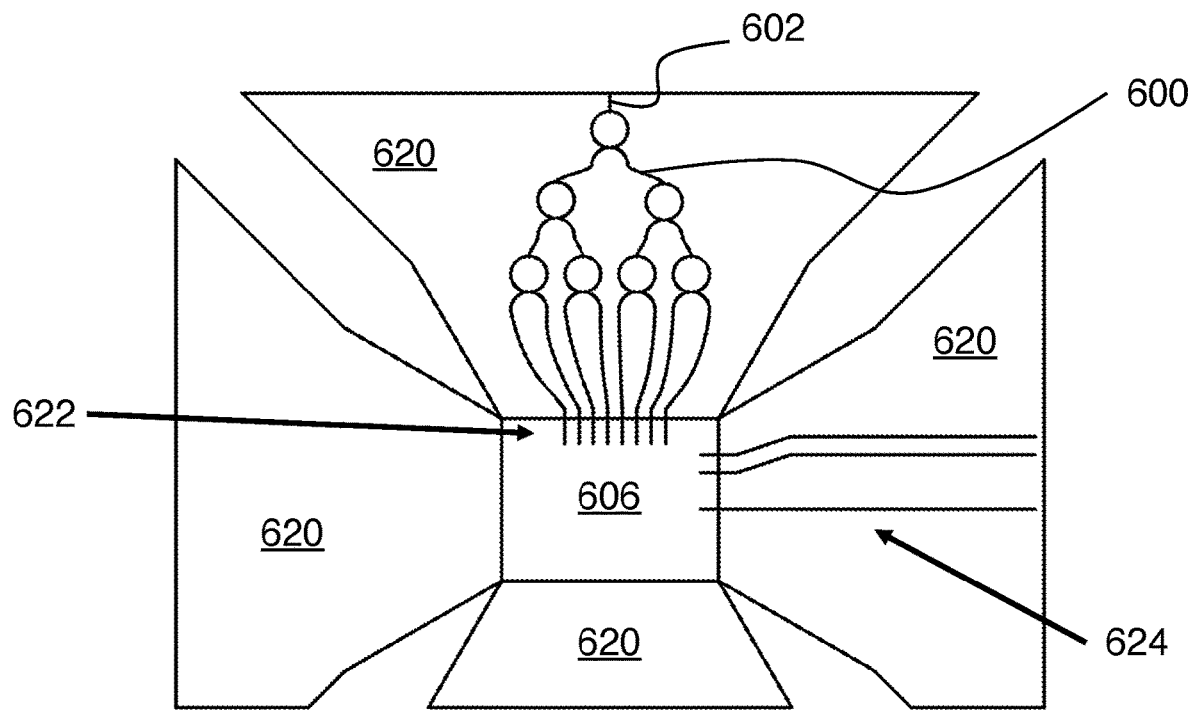
FIG. 6C schematically shows an example of integration of the device of FIG. 6A with an array of cantilever probes.
Figure 6D:
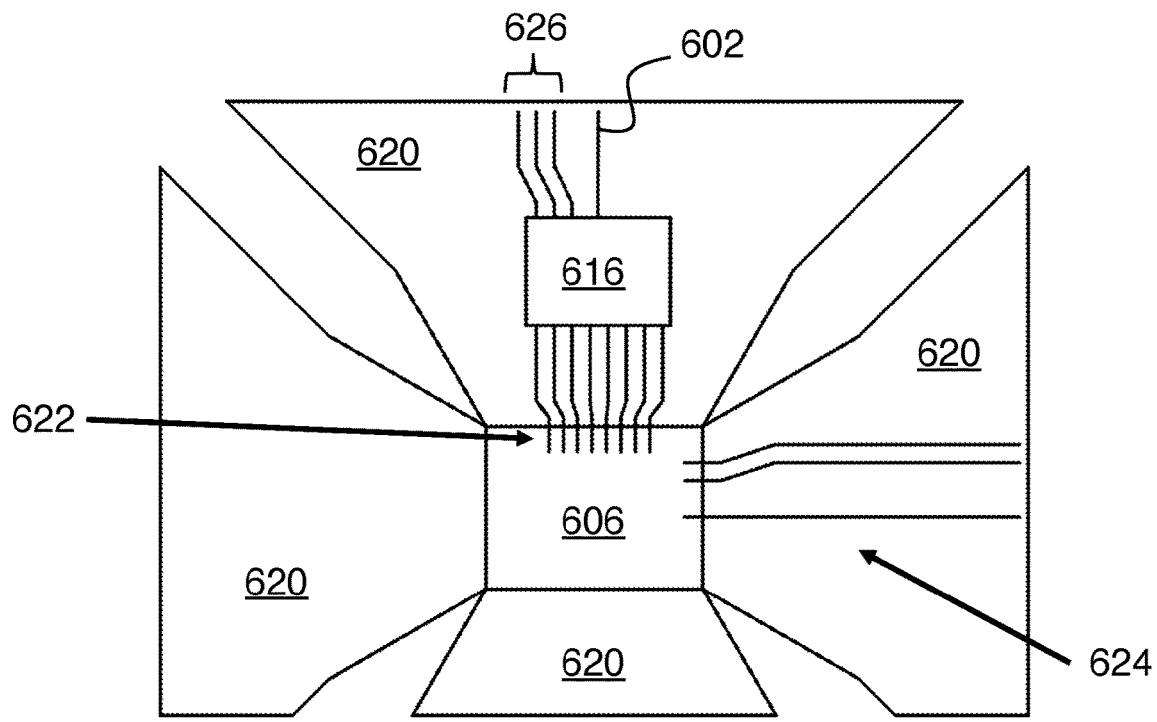
FIG. 6D schematically shows an example of integration of an active signal splitter (or combiner) with an array of cantilever probes.

FIG. 6C (which is a top view) schematically shows an example of integration of the N:1 device of FIG. 6A with an array of cantilever probes. Here 620 is the substrate for the probe head, 622 are the cantilever probes and 624 are other inputs/outputs to device under test 606 (e.g., power and control connections as needed for testing, etc.). The example of FIG. 6D is similar to the example of FIG. 6C, except that an active N:1 device 616 is used instead of the passive N:1 device 600. Connections 626 are the power/ground/control connections to active N:1 device 616. Here also there is only a single test input/output 602, as in the previous examples.

The N:1 electrical signal combiner can be integrated with the N-port electrical device under test. This can provide on-board testing capability in accordance with principles of the invention.

For example, the "virtual test range" circuitry can also be fabricated on the same die as the primary function die. This provides built in test access. Switches can be used to activate the "virtual test range" circuits or they can be coupled to the RF ports for continuous monitoring purposes. This method can also be implemented in the digital domain by either using a down-converting or direct sampling receiver as the test beam-forming network. Each beam-forming channel phase shifter and gain control can be implemented as a digital filter (FIR, IIR or otherwise) and the gain control is a simple multiplication. In all cases the receive and transmit directions can be interchanged, thus the same method can be used to evaluate performance of a receiver by generating the appropriate transmit beam shape and checking that the beam-forming receiver has adequate spatial discrimination.

Figure 7A:
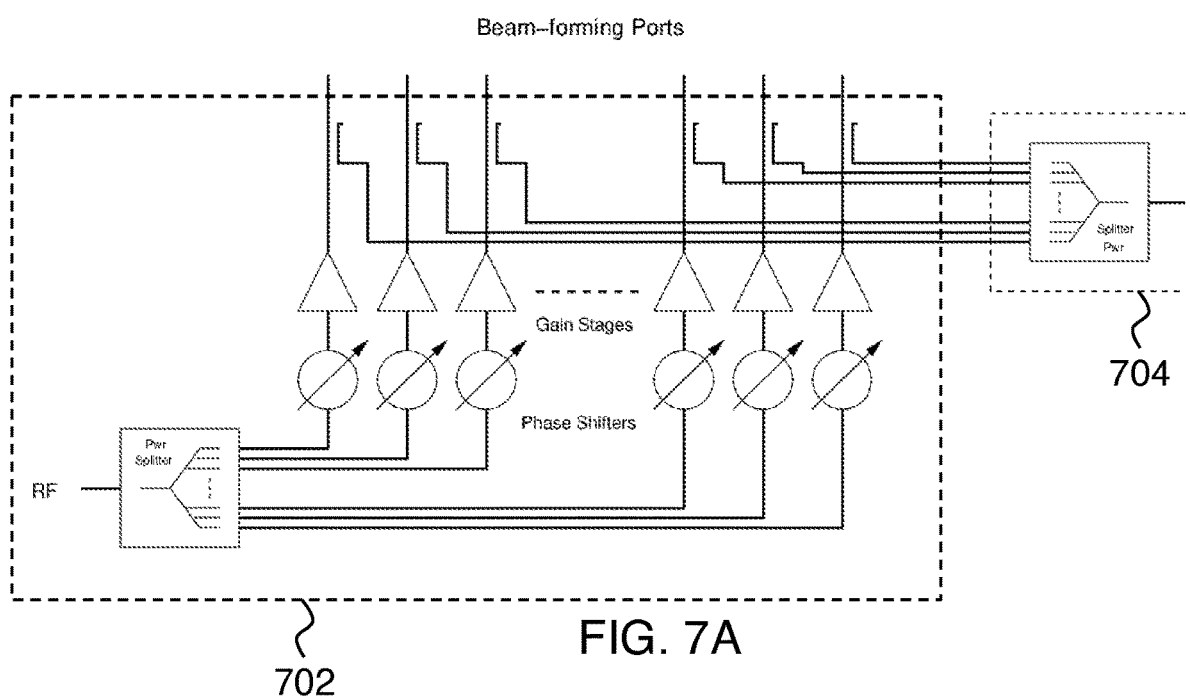
FIGS. 7A-C show examples of integration of test circuitry with the device under test according to principles of the invention.
Figure 7B:
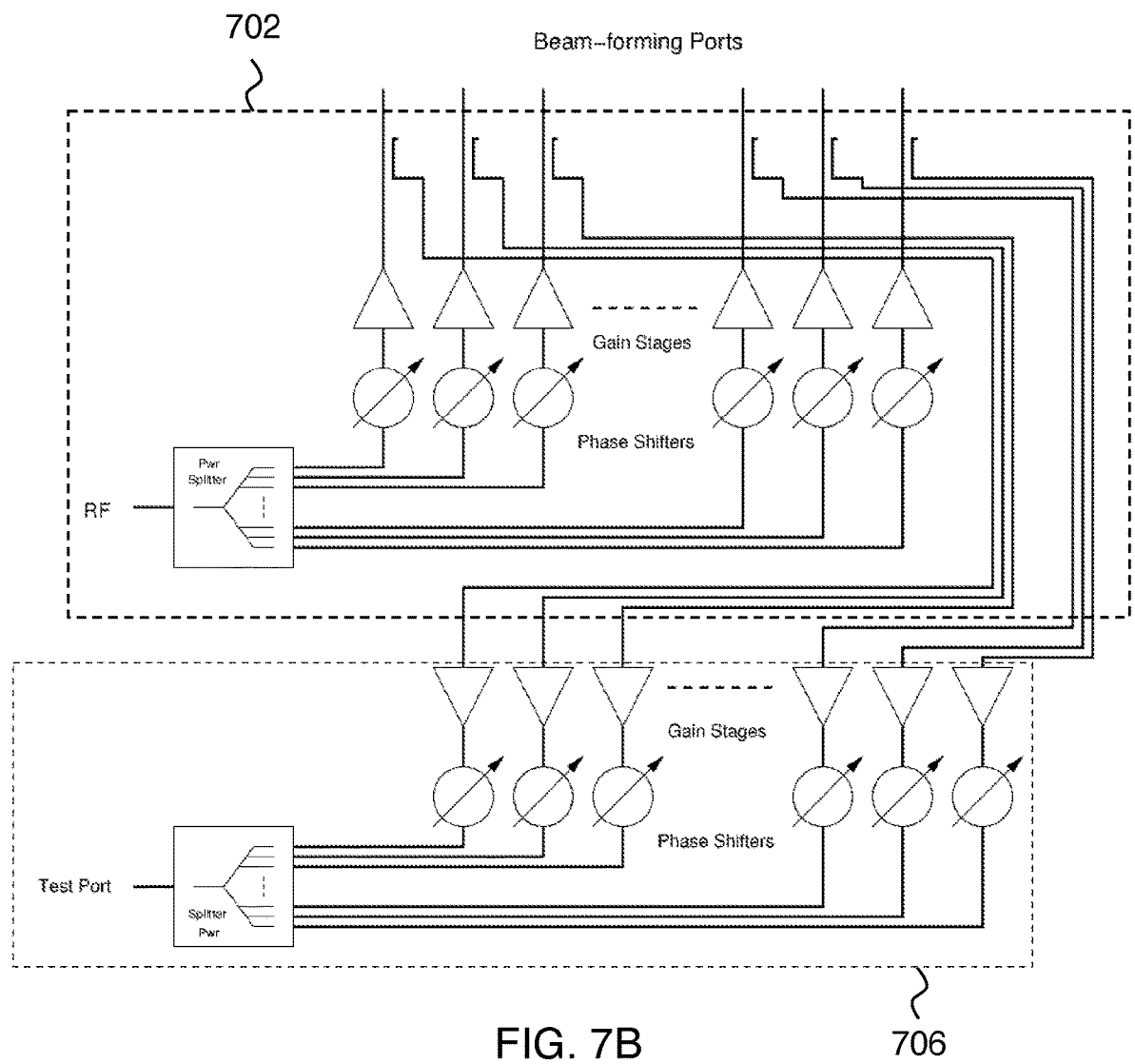
Figure 7C:
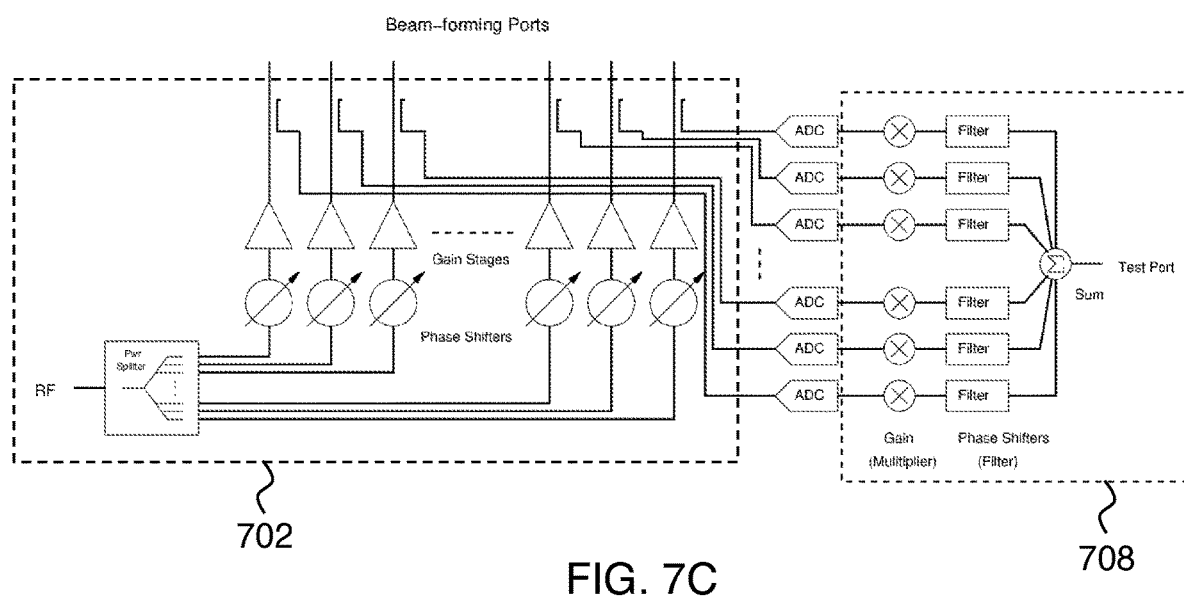

FIGS. 7A-C show several examples of this idea. In all examples, 702 is the device under test. The example of FIG. 7A shows use of a passive N:1 electrical signal network 704. The test port beam-forming can be on die, on the laminate or PCB. Coupled sampling allows for testing during normal operation.

The example of FIG. 7B shows use of an active N:1 electrical signal network 706. The test port beam-forming can be on die, on the laminate or PCB. Coupled sampling allows for testing during normal operation. The test port can be independently beam steered and can test for main beam power as well as sidelobe rejection during normal operation.

The example of FIG. 7C shows use of an active N:1 electrical signal network 708 where the active N:1 electrical signal network is implemented digitally.

In general, any of the preceding embodiments can be implemented in analog circuitry, digital circuitry or in a hybrid analog-digital system. Furthermore, digital signal processing (e.g., filtering) can be done in any combination of hardware and/or software.

Figure 8A:
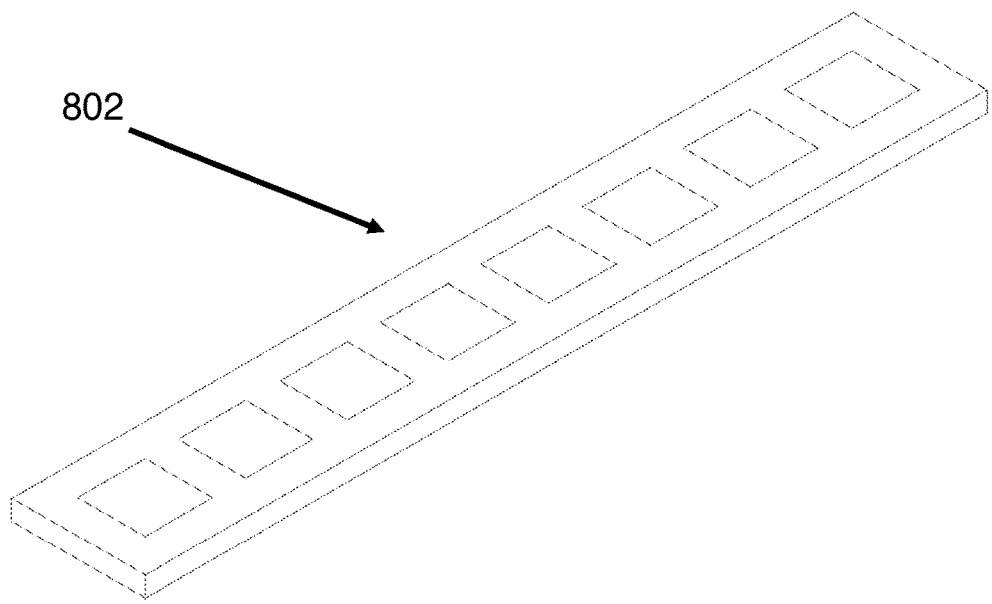
FIG. 8A shows an example of a 1D array.
Figure 8B:
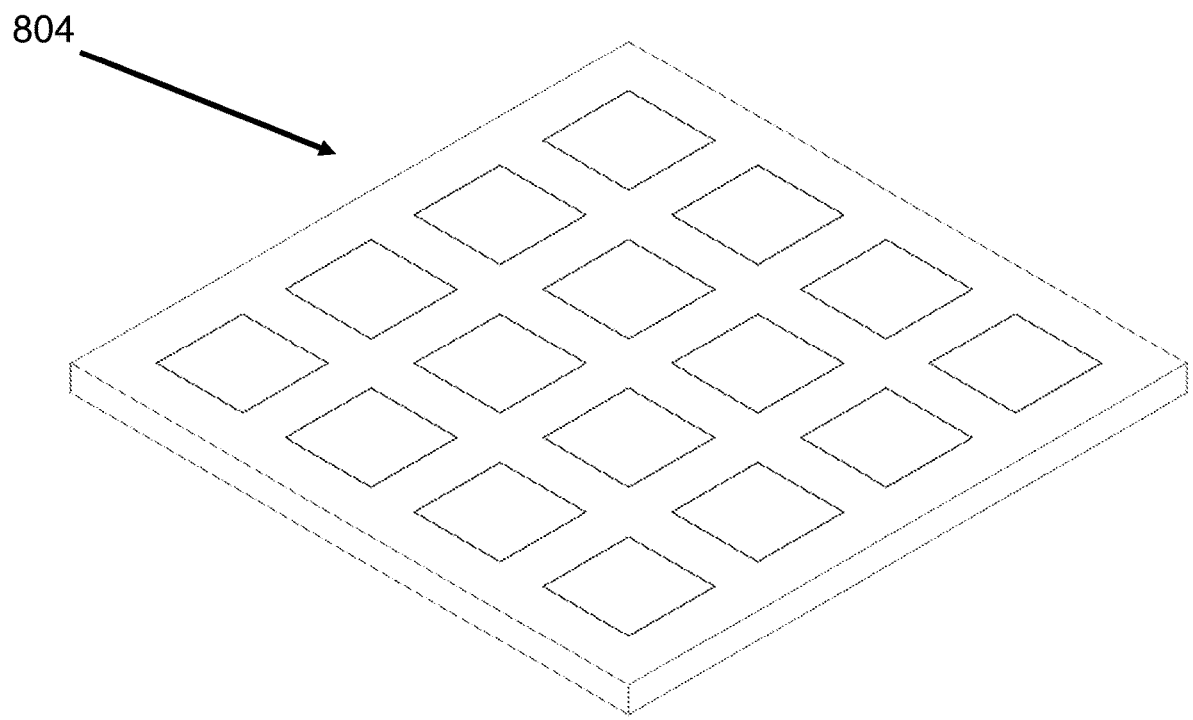
FIG. 8B shows an example of a 2D array.

For simplicity, the preceding examples have shown the beamforming devices as 1D arrays. It is also possible to apply principles of the invention to characterize beamforming devices that have 2D arrays of elements. Beamforming device 802 on FIG. 8A is an example of a 1D array, and beamforming device 804 on FIG. 8B is an example of a 2D array. For a 2D beamforming device having an 2D array of $N_x$ by $N_y$ ports, the preceding description is applicable simply by taking $N=N_x N_y$. Naturally the phase shifts corresponding to far field angles have to be worked out in 2D rather than in 1D, but how to do this is well known in the art.

The invention claimed is:

1. An apparatus for electrically testing an electrical device under test, wherein the electrical device under test has N ports, the apparatus comprising:
an N:1 electrical signal network configured to be directly connected to the N ports of the electrical device under test and to provide a single electrical test port;
a test controller configured to control at least the electrical device under test to provide characterization of the electrical device under test;
wherein the characterization uses the single electrical test port as a test input and/or output instead of individually using the N ports of the electrical device under test as test inputs and/or outputs;
wherein the electrical device under test is a beamforming transmitter, and wherein the N:1 electrical signal network is configured as a virtual antenna range such that the single electrical test port provides an output signal from the electrical device under test at a selected far field direction.

2. The apparatus of claim 1, wherein the N:1 electrical signal network is an active network configured to be controlled by the test controller, whereby the selected far field direction can be varied by the test controller.

3. The apparatus of claim 1, wherein the N:1 electrical signal network is a passive network.

4. The apparatus of claim 1, wherein the N:1 electrical signal network is an active network configured to be controlled by the test controller.

5. The apparatus of claim 1, wherein the N:1 electrical signal network is integrated with a probe array for testing electrical devices, whereby the electrical device under test can be tested via probing.

6. The apparatus of claim 1, wherein the N:1 electrical signal network is integrated with the electrical device under test.

7. An apparatus for electrically testing an electrical device under test, wherein the electrical device under test has N ports, the apparatus comprising :
- an N:1 electrical signal network configured to be directly connected to the N ports of the electrical device under test and to provide a single electrical test port;
- a test controller configured to control at least the electrical device under test to provide characterization of the electrical device under test;

wherein the characterization uses the single electrical test port as a test input and/or output instead of individually using the N ports of the electrical device under test as test inputs and/or outputs;

wherein the electrical device under test is a beamforming receiver, and wherein the N:1 electrical signal network is configured as a virtual antenna range such that the single electrical test port provides a test signal to the electrical device under test at a selected far field direction.

8. The apparatus of claim 7, wherein the N:1 electrical signal network is an active network configured to be controlled by the test controller, whereby the selected far field direction can be varied by the test controller.

9. The apparatus of claim 7, wherein the N:1 electrical signal network is a passive network.

10. The apparatus of claim 7, wherein the N:1 electrical signal network is an active network configured to be controlled by the test controller.

11. The apparatus of claim 7, wherein the N:1 electrical signal network is integrated with a probe array for testing electrical devices, whereby the electrical device under test can be tested via probing.

12. The apparatus of claim 7, wherein the N:1 electrical signal network is integrated with the electrical device under test.

* * * * *